April 18, 1950 W. C. HUEBNER 2,504,527
CARRIER FOR PHOTOGRAPHIC ROLL FILMS FOR CAMERAS
Filed April 12, 1947 6 Sheets-Sheet 1

INVENTOR.
William C. Huebner,
BY Parker, Prochnow & Farmer,
Attorneys.

April 18, 1950 W. C. HUEBNER 2,504,527
CARRIER FOR PHOTOGRAPHIC ROLL FILMS FOR CAMERAS
Filed April 12, 1947 6 Sheets-Sheet 2
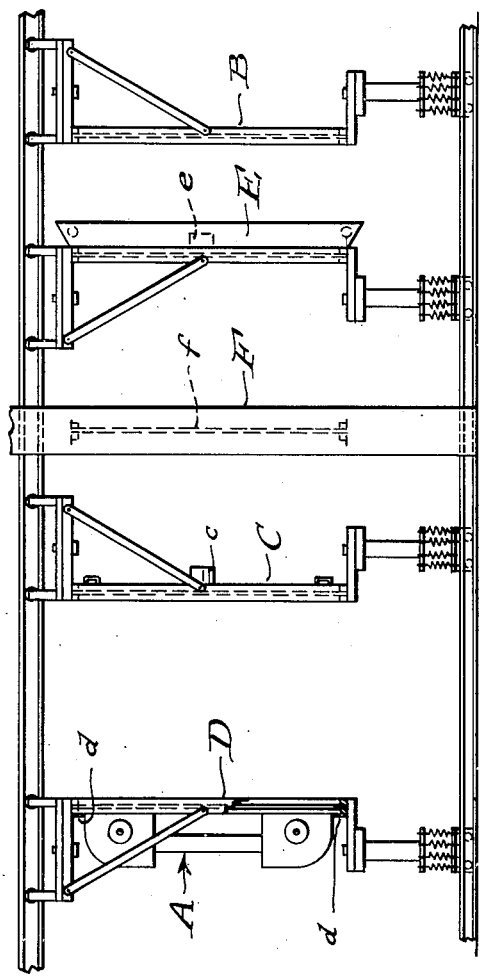
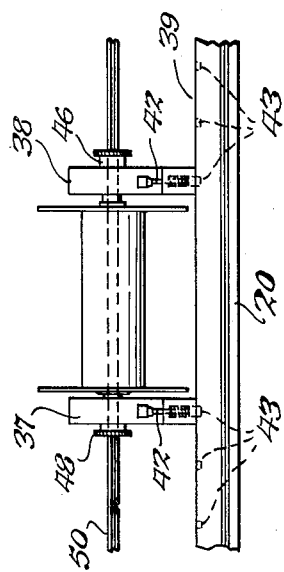
Inventor
William C. Huebner,
By Parker, Rochrow & Farmer,
Attorney April 18, 1950 W. C. HUEBNER 2,504,527
CARRIER FOR PHOTOGRAPHIC ROLL FILMS FOR CAMERAS
Filed April 12, 1947 6 Sheets-Sheet 3
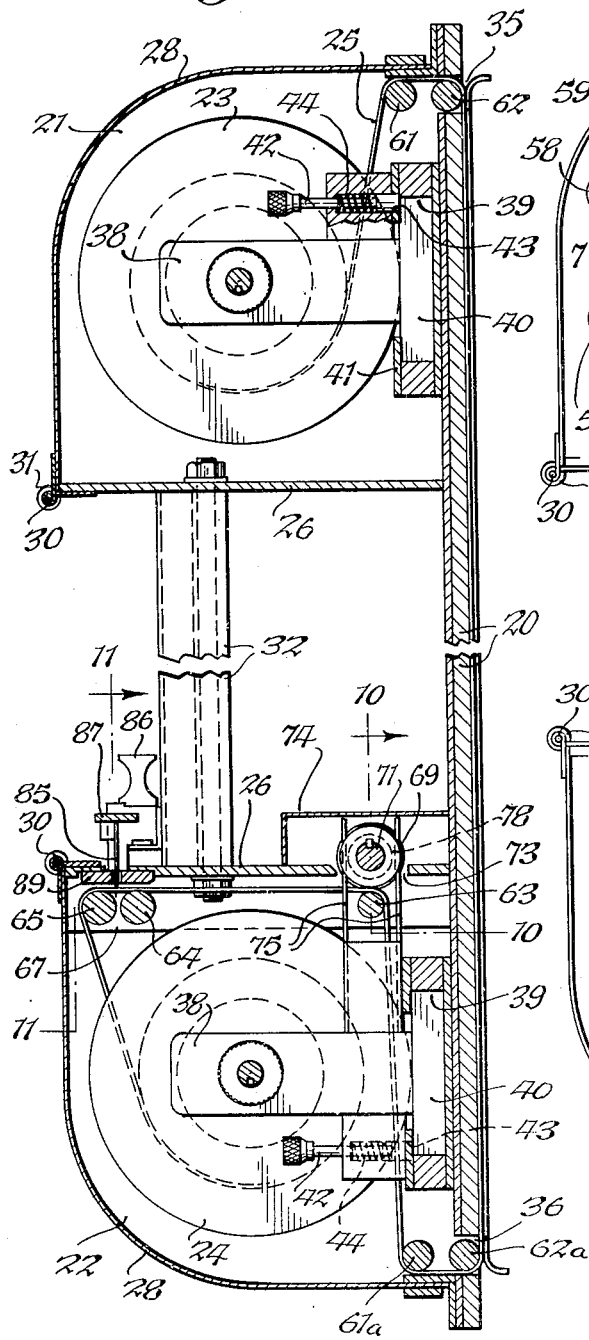
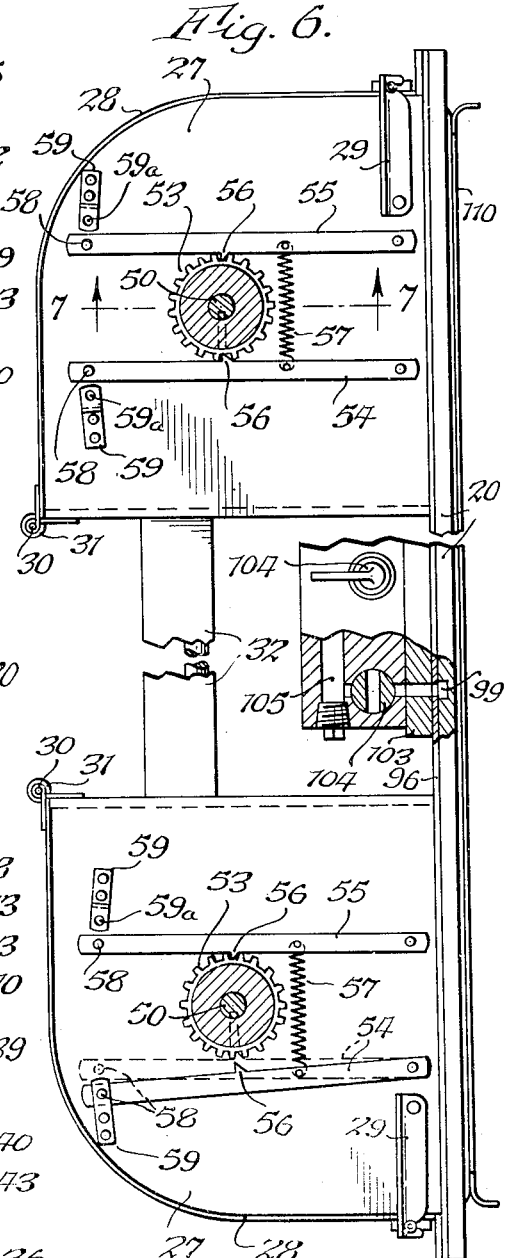
Inventor
William C. Huebner

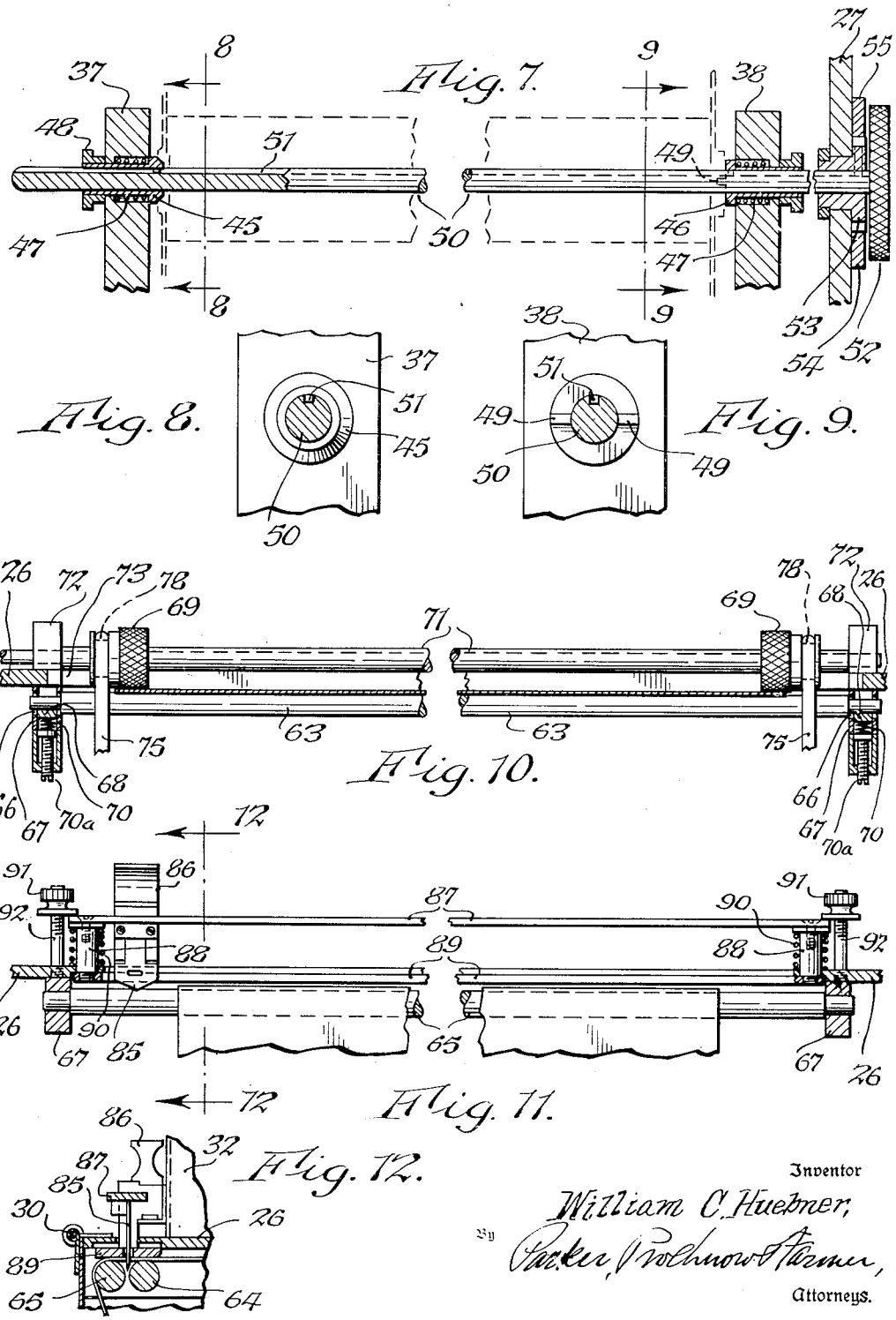

April 18, 1950 W. C. HUEBNER 2,504,527
CARRIER FOR PHOTOGRAPHIC ROLL FILMS FOR CAMERAS
Filed April 12, 1947 6 Sheets-Sheet 5
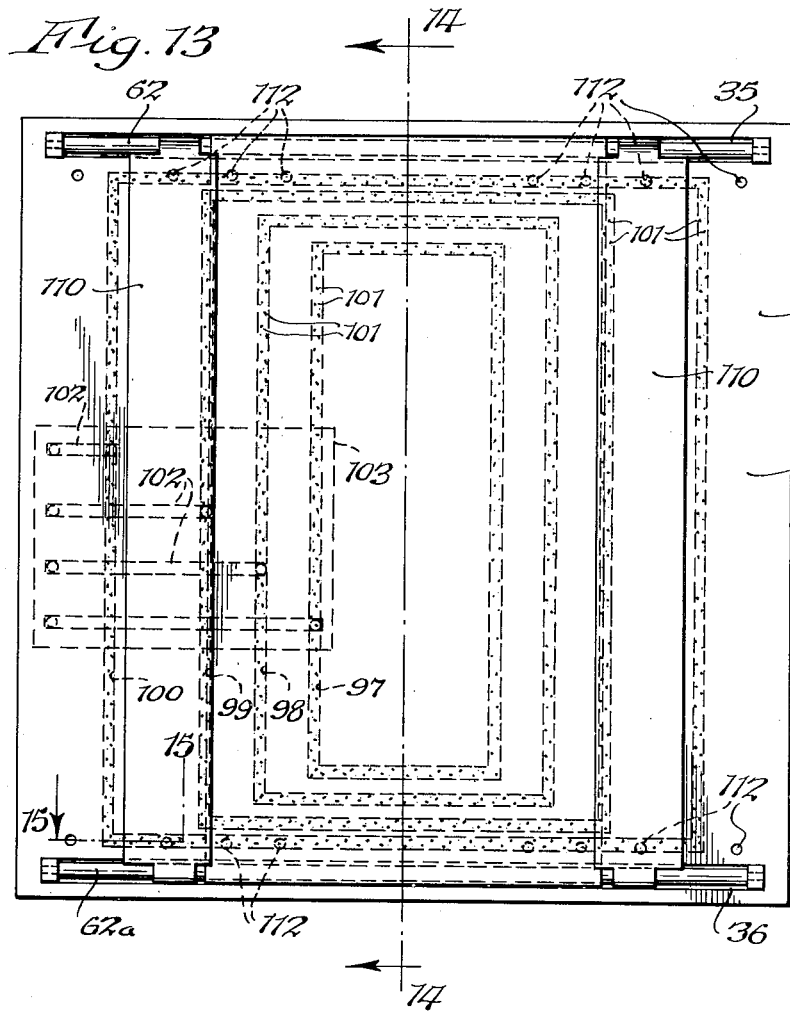
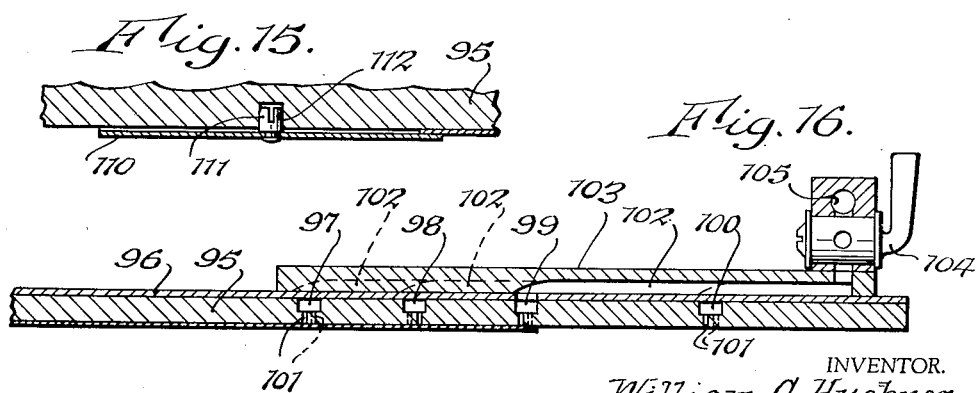
INVENTOR.
William C. Huebner,
BY Parker, Prodmow Farmer,
Attorneys.

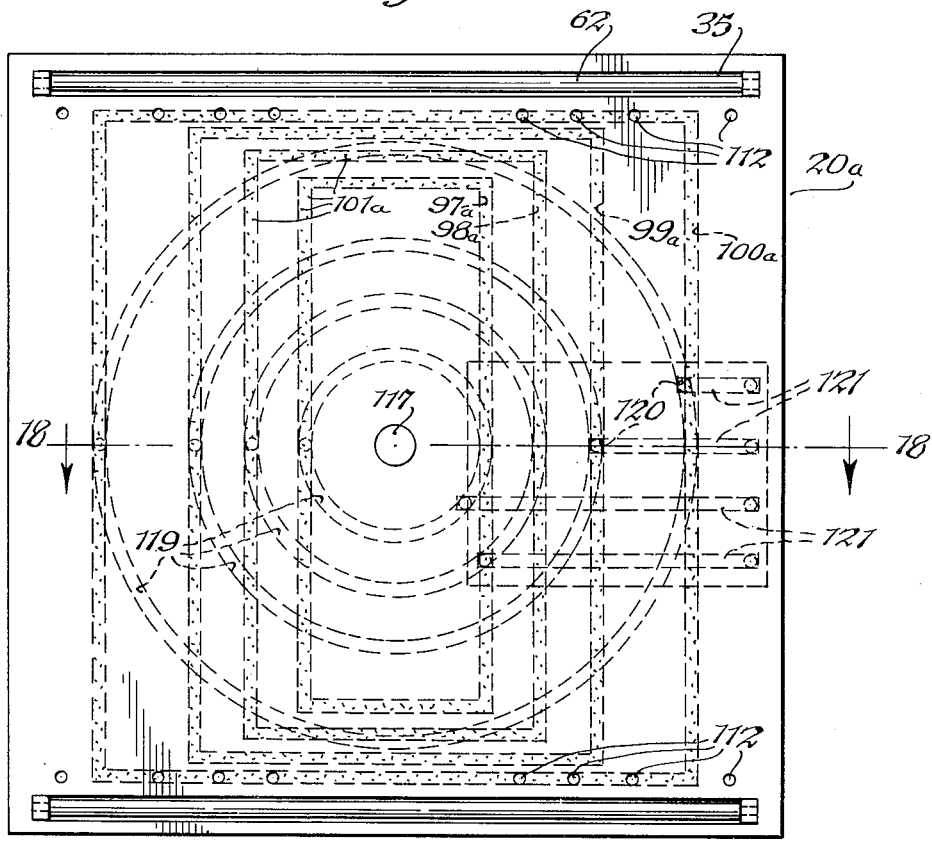
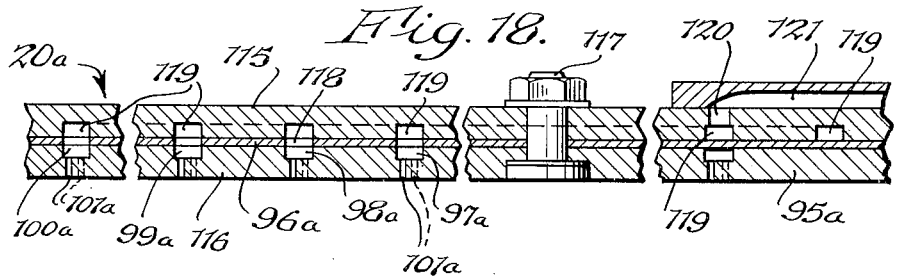

Patented Apr. 18, 1950 2,504,527

UNITED STATES PATENT OFFICE 2,504,527

CARRIER FOR PHOTOGRAPHIC ROLL FILMS FOR CAMERAS

William C. Huebner, New York, N. Y.

Application April 12, 1947, Serial No. 741,035

10 Claims. (Cl. 95—34)

This invention relates to carriers for sensitized or photographs roll films for use in cameras for photographing images on successive portions or in required positions on roll films. Roll film carriers embodying my invention are adapted for use in various types of cameras, such as the phototextype composing machine camera of my U. S. Patent No. 2,180,417 of November 21, 1939; and also in photo mechanical cameras and commercial reproduction cameras in general.

Heretofore the means for holding or supporting roll films in cameras have been built into cameras as part of the camera mechanisms, which ties up the cameras for use on roll films only.

In commercial use, however, of cameras such as overhead, dark room cameras and gallery type cameras, where the sensitive film or material has to be loaded in a box in the dark room and then carried to the camera, it is obvious that a portable roll film carrier would have many advantages and a greater flexibility in producing varieties of work such as is needed, for example, when textype is composed around spaces allowed for illustrations, as in newspapers, magazines and books. Obviously, the illustrations, particularly in color work, need to be made on special work or glass plates, in which case a portable roll film carrier can be readily removed from the camera and set aside to make way for the use of glass or other plates. Thus, the camera is cleared of the roll film mechanism. Another advantage in a portable roll film carrier is that by the use of two roll film carriers, one carrier may be loaded in the dark room and made ready for a particular job while the film of the other carrier is being exposed to the work in hand. Thus, greater production can be achieved from the same camera by the use and conveniences provided in a portable roll film carrier.

One object of my invention, therefore, is to provide a roll film carrier in the form of a portable unit embodying the film roll supporting means, light-excluding housing means therefor, operating means for placing and maintaining successive portions of the film in exposure position in the camera, and other elements of the device hereinafter disclosed, which portable unit is adapted to be transported and readily placed in operative position in and removed as a unit from cameras of various types.

Another purpose of my invention is to provide a roll film carrier adapted particularly for use in connection with a phototextype composing machine camera where it is necessary to place the film in precise position for receiving type images photographed in predetermined locations and when the line is completed it is necessary that the film be adjusted vertically to provide a predetermined space between the succeeding line of type and the one already photographed or exposed. Where the same point size type is used the line spacing must be exactly uniform, but these spaces will vary according to the other point sizes of type used in the composition. The details described hereinafter will show clearly how this film positioning may be achieved quickly and accurately so that the exact portions of the film exposed are known to the operator and controlled by him at all times.

Another purpose of this film carrier is to provide a measuring device whereby the amount of film that has passed over the surface of the film exposure support to receive exposures may be measured accurately and a record built up in a measurement register or counting device which will indicate in inches and fractions of inches the amount of film that has been exposed. Thus, the operator will know at all times the areas required by a given layout of textype composition, for example, and the margins between pages, so that if desired, the entire roll may be exposed with as many pages of textype matter as desired, with proper spacing allowed for margins, before the roll is developed.

Another purpose of the roll film carrier is to provide means whereby the film may be cut quickly and accurately in a precisely predetermined line so that proper margins of the separate films cut from the roll may be known ahead of time in order to serve the practical purpose of making prints from the images on the film to plates or cylinders used in printing presses, or for any other purpose for which the exposed film is to be used.

Another object of the invention is to provide a roll film carrier in which any of a variety of spools carrying sensitized film or paper of different widths can be mounted in the same roll film carrier to permit the use therein of a film of any desired width. Since sensitized film is comparatively expensive, it is highly desirable to economize in the use of film by using in the carrier a film of just sufficient width for the work in hand.

Other objects are to provide means for measuring the film as it is unwound from the unexposed spool and wound up on the empty spool; and for measuring the various used portions of the film, whether they are wound upon the empty spool or whether they are merely measured to determine the cut-off line on the outside margin of the work area, whereby the film may be cut quickly and conveniently and emptied into a container without winding such portions on the spool. Additional objects are to equip the carrier with novel, efficient cutting means to accomplish the cutting of film or web material in the measured lines; and to visually indicate, in inches and fractions thereof, the exact areas of the exposed portions of the film.

Another purpose is to provide novel vacuum means in the roll film carrier to hold the film flat during exposure, according to the width of the film used, and to shut off unused areas of the vacuum support so that the vacuum or suction is confined to only the width of the film used.

Another purpose of the invention is to permit the adjustment of the film to position it with reference to special exposure lines whereby a line of type characters may be exposed with precise spacing between the lines of type, regardless of the point size of type characters to be exposed to the film surface. To emphasize the importance of providing means of precisely positioning that portion of the unexposed film relative to the exposed portions, it is apparent that the precision placement of characters in high speed phototextype composing cameras must be under absolute control of the operator, with particular reference to the composition of book pages, magazine pages, newspaper pages, and any other form of printing in which type faces are needed to be positioned according to columns, leaving box-like areas later to be occupied by illustrations, headings, display type, etc., in whatever form is needed for a given purpose.

Further objects and advantages of the invention will appear from the following specification of the preferred embodiments of the invention shown in the accompanying drawings, and the novel features of the invention are set forth in the appended claims.

In said drawings:

Fig. 3 is a diagrammatic side elevation of a composing and image-reversing camera illustrating the roll film carrier removably mounted in operative position therein;

Fig. 4 is a fragmentary bottom plan view of the carrier similar to Fig. 2, but showing a spool for a narrower film rotatably mounted in the carrier;

Fig. 5 is a sectional elevation, on a larger scale, of the carrier on line 5—5, Fig. 1;

Fig. 6 is an end elevation, partly in section thereof, on line 6—6, Fig. 1;

Fig. 7 is a sectional elevation of the mounting and rotating means for one of the film spools illustrating the manner of removably mounting and turning spools of different lengths;

Figs. 8 and 9 are transverse, sectional elevations thereof on lines 8—8 and 9—9 respectively, Fig. 7;

Fig. 10 is a plan view, partly in section, on line 10—10, Fig. 5, showing the driving means for the measuring or registering device for indicating the lengths of portions of the film which have been unrolled for photographing images thereon.

Figure 1:
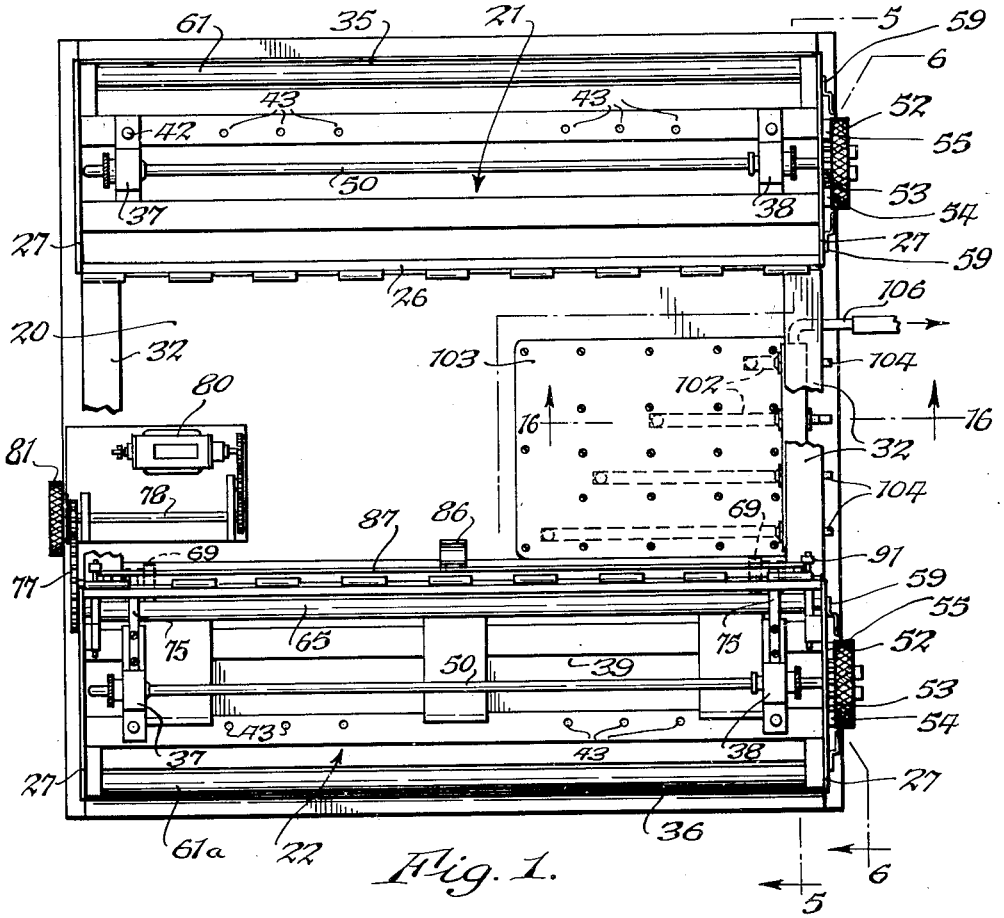
Fig. 1 is a rear elevation of a roll film carrier of a construction exemplifying one embodiment of my invention.
Figure 2:
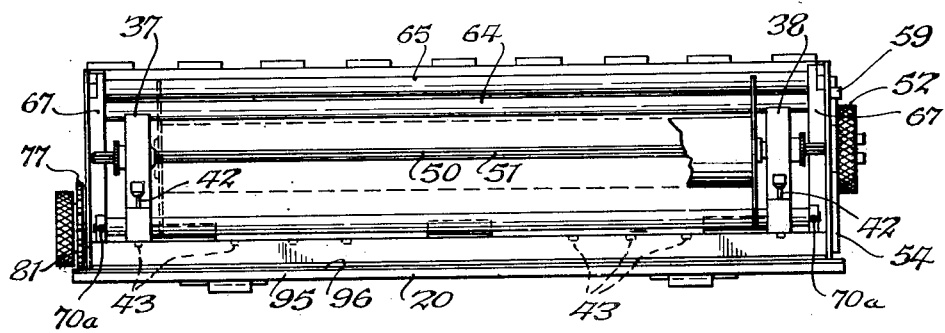
Fig. 2 is a bottom plan view thereof as seen looking upwardly from the bottom of Fig. 1 and showing therein partly by solid and partly by broken lines, a spool of a length suitable for the widest film to be used in the carrier.

Fig. 11 is a plan view, partly in section, on line 11—11, Fig. 5, showing cutting means for the roll film;

Fig. 12 is a transverse section of the film cutting means on line 12—12, Fig. 11;

Fig. 13 is a front elevation of the main plate support of the carrier illustrating the vacuum or suction means for holding flat thereon in operative exposure position, successive portions of films of different widths;

Fig. 14 is a sectional elevation thereof on line 14—14, Fig. 13;

Fig. 15 is a sectional plan view thereof on line 15—15, Fig. 13, showing one of the pressure holding strips for the side edges of the films;

Fig. 16 is a transverse section thereof, enlarged, on line 16—16, Fig. 1, showing one of the vacuum controlling valves and passage connections for holding a film of one width;

Fig. 17 is a front elevation showing a modification of the main plate support and vacuum film holder;

Fig. 18 is a transverse section thereof on line 18—18, Fig. 17.

The roll film carrier as illustrated in Figs. 1 to 16 as one exemplification or embodiment of my invention, is constructed as follows: The carrier or device has a main support or base member 20 which is of rectangular plate form and, as shown, is of a composite plate construction for a purpose hereinafter explained. This member, see Figs. 5 and 6, carries or supports at opposite or top and bottom end portions thereof housings 21 and 22 which form light-excluding chambers adapted to enclose roll film spools 23 and 24 for a sensitized or photographic film 25 which is adapted to extend from one to the other of the spools and to be wound on one spool, as for example, on the spool 24 from a roll of unexposed film on the spool 23. The film as thus wound from one spool onto the other, passes or moves over a portion of the front face of the plate support 20 for supporting successive portions of the film, as unwound, in position for exposure in a camera to produce photographic images on successive portions on the roll film.

Each of the housings 21 and 22, as shown, is formed by a stationary side wall 26 and opposite end walls 27 which are secured in any suitable manner on and project rearwardly from the plate support 20, and a movable cover member 28 which may be suitably hinged at one side edge thereof to the housing side plate 26, and extends therefrom around the rear and opposite side edges of the housing end plates 27, the free edge of the cover plate being releasably held closed by suitable means, such as latches 29, Fig. 6, at opposite ends of the housing adapted to engage projections at the ends of the free edge of the cover plate. Each housing is thus adapted to be opened to afford access to the spool and film within said housing. Preferably the hinge for the cover 28 has a hinge rod or pin 30 which passes through registering hinge loops or members on the cover and side wall of the housing and is adapted to be withdrawn from the hinge loops to permit complete removal of the housing cover 28 if this found more convenient for any purpose, the hinge pin for this purpose being provided with a knob 31 at one end, to facilitate its removal. As shown, the housings 21 and 22 are connected and braced against relative movement by brace members 32 extending between and bolted at opposite ends to side walls 26 of the two housings. Thus, each housing can be opened by swinging its cover open on its hinges or by completely removing the cover, as may be most convenient, for opening up the housing for the purpose of rotatably mounting the spool therein or removing it, attaching the ends of the film to the spool onto which it is to be wound or for removing from the housing portions of the film which may have been cut from the continuous film strip, as hereinafter explained, or for other needful operations in the practical use of the film carrier. The joints between the cover and the stationary walls of the housing can be sealed or closed to make the housing light-tight, as by sealing or closure strips applied along the joints, or other usual or suitable closure means, which it is considered unnecessary to illustrate.

A film spool with a roll of unexposed film thereon is adapted to be rotatably mounted in one of the housings, as illustrated for instance by the spool 23 in the housing 21, and the film is passed from the spool out of the housing through a tranversely extending slot 35 in the plate support 20 near one end thereof, and passes from this slot over or against the outer or front face of the plate support and through a second transverse slot 36 in the plate support near its opposite end into the second housing 22 for connection with the second spool 24. By rotating the spool 24, the film may be wound thereon from the roll of film on the first spool and, in being so wound thereon, the portion of the continuous film strip extending between the spools is moved along the outer face of the plate support 20 with its sensitized surface outermost, so that successive portions of the film strip between the exit and entrance slots 35 and 36 may be supported by the plate support 20 in an exposed position, such that when the roll film carrier is mounted in operative position in a camera, as illustrated in Fig. 3, successive portions of the film strip are adapted to be supported in operative exposure position in the camera for making photographic images from a subject on such successive portions of the film strip.

Fig. 3 illustrates more or less diagrammatically or schematically the use of the roll film carrier in a composing and image-reversing camera of the type shown in my U. S. application for patent, Serial No. 620,883, filed Oct. 8, 1945, now Patent No. 2,458,269 issued January 4, 1949. This camera, as fully disclosed in said application, comprises a subject or copy support B, a lens support C mounting a lens c, a sensitized film support D, and a light support E which may mount a second lens e, which supports are adjustable relatively toward and from each other and toward an intermediate support F adapted to mount a transparent image-receiving plate or member f. In this camera, for instance, the roll film carrier, designated as a whole as A, is removably mounted in the open rectangular frame of the support D with the portion of the film exposed at the front face of the plate support 20 of the carrier A facing the lens c. The carrier A may be removably retained in operative position in the open frame of the support D by any suitable means, as for instance, by retaining devices d which permit ready mounting of the carrier in and its removal from the camera. An image of the subject mounted on the support B is adapted to be projected by the lens e onto the transparent plate f and this image is projected in reversed position by the lens c onto an exposed portion of the film 25 on the carrier A. It will be understood that Fig. 3 is simply intended to illustrate an example of one of the uses of the roll film carrier and that the latter is adapted for use in cameras of various other types or constructions suitable for different kinds of work.

Each film spool 23, 24 is rotatably supported so as to be readily mounted for rotation and to be dismounted or removed, preferably between end bearing supports or brackets 37 and 38, see Figs. 1, 2, 5 and 7, arranged adjacent opposite ends of the spool. These brackets are mounted for movement toward and from each other to different distances apart in a guideway 39 of suitable construction extending parallel with the axis of the spool on the rear of the plate support 20 within the housing for the spool, each bearing support 37, 38 having a base portion 40 which is slidably aranged and retained in the guideway, as by side plates 41 of the guideway overlying opposite ends of the base portion of the bearing support. The bearing supports thus are adjustable to different positions to accommodate between them spools for roll films of several different widths varying, for instance, from the length of the shortest spool illustrated in Fig. 4, to that of a spool of greatest length, shown in Fig. 2, thereby adapting the carrier for use with films of various different widths, depending upon the width of the film most suitable for the work in hand. The bearing supports 37, 38 are adapted to be releasably secured in the different positions required for spools of different lengths, as by a retaining pin 42 for each bearing support movable endwise in a cavity in the base portion of the support into one of a series of holes 43 in the side portion of the guideway for the supports. Four keeper holes 43 are shown for retaining each support in four different adjustments to suit spools of four different lengths, but the number and spacing of the retaining holes can be varied, as required, depending upon the number and the widths of the films to be used in the camera. The securing pin may be normally held in engagement with one of the keeper holes 43, as by a spring 44, Fig. 5, surrounding the pin between a shoulder thereon and a shoulder of the pin cavity in the bearing support. Each securing pin shown is provided at its upper end with a finger piece by which it may be raised against the action of its spring to release and permit adjustment of the bearing support.

The bearing supports 37, 38, see Fig. 7, are provided with rotatable journal or spool-engaging members 45 and 46 adapted to enter central sockets in the opposite ends of the spool for rotatably supporting the spool on the bearing supports. These journals 45 and 46 are normally pressed inwardly for supporting engagement with the spool, as by springs 47 surrounding the journals in circular cavities in the bearing supports, and the journals can be pulled outwardly by means of heads 48 at their outer ends against the action of their springs for releasing the spool. One of the journals 45, as shown, may be provided with a conical inner end simply adapted to seat loosely in the central socket in the adjacent end of the spool, but the other journal 46 is provided at its inner end with a cross rib or part 49, Figs. 7 and 9, adapted to enter a complementary notch in the adjacent end of the spool, so that the spool is caused to turn with the journal and can be rotated by rotating this journal 46. An axial shaft 50 for each spool extends through the journals 45 and 46 for said spool, and this shaft has a longitudinal keyway 51 in which keys in the journals 45 and 46 engage, so that by rotating the shaft 50, the journals will be rotated therewith for rotating the spool. This shaft is axially slidable through the journals to permit the described adjustment of the bearing supports 37 and 38 to supporting positions for spools of different lengths, and the shaft can be pulled out through the journals, as by means of a finger wheel 52 on one end of the shaft to enable a spool to be rotatably mounted on or removed from between the end bearing supports 37 and 38. By this construction the bearing supports 37 and 38 for either spool 23, 24, can be adjusted to different distances apart for rotatably supporting spools of different lengths, and the spool, regardless of its length, can be rotated for winding thereon or unwinding the film by rotating the shaft, and the shaft serves to cooperate with the guideway for bearing supports in holding the journals for opposite ends of the spool in axial alinement, so as to ensure the correct relative positioning of the spools for the opposite ends of the film, to ensure the proper winding and unwinding action of the film. The shaft for either spool may be rotated for turning the spool to wind the film thereon, as by means of the finger wheel 52 on the outer end of the shaft.

In the use of the roll film carrier for the various purposes for which it is adapted, it is desirable to provide for turning either spool in either direction, as may be required, to wind the photographic film thereon from a film roll on the other spool, and to prevent rotation of either spool in a direction reverse to that in which it is rotated to wind the film thereon, so as to prevent slackness in the portion of the film strip extending from one spool to the other. For this purpose, a ratchet or detent mechanism is provided for each spool operable to permit the spool to be positively turned in either direction and to releasably hold the spool against unintentional opposite or reverse rotation. Each mechanism, as shown in Figs. 6 and 7, comprises a gear or toothed wheel 53 surrounding the outer end portion of the spool shaft 50, arranged to rotate and held from axial movement in a bearing opening in the adjacent end wall 27 of the housing for the spool and splined to the shaft 50 to turn therewith by a key in the wheel engaging in the keyway 51 of the shaft. Two detent levers 54 and 55 each pivoted at one end on the housing wall 27, extend past opposite sides of the toothed wheel 53, each lever having a tooth 56 with an inclined face and an opposite abrupt face adapted to engage between adjacent teeth of the wheel. These teeth are held in yielding engagement with the teeth of the wheel 53, as by a spring 57 connecting the two levers 54, 55 between their ends. In the position of the levers for the spool 23, shown at the upper end of Fig. 6, the spring 57 holds the teeth of both detent levers in engagement with the teeth of the wheel at opposite sides thereof so that one lever holds the wheel from turning in one direction and the other lever holds the wheel from turning in the opposite direction, thus holding the wheel and spool from rotation in both directions. By securing one lever 54 out of engagement with the wheel 53 and leaving the other in engagement with the wheel, as shown for the spool 24 at the lower end of Fig. 6, this position of the levers permits the spool 24 to be turned in an anti-clockwise direction for winding the film thereon and prevents reverse rotation of the wheel and spool. If, however, the lever 54 is allowed to be held by its spring with its tooth in engagement with the wheel and the other lever 55 is held with its tooth out of engagement with the wheel, then the wheel and spool are free to rotate in a clockwise direction. Both levers are adapted to be held in yielding engagement with the wheel by the spring 57, but either lever is adapted to be releasably held with its tooth out of engagement with the wheel, as by the engagement of a pin 58 on the free end of the lever in a hole 58a of a keeper 59 secured on the housing wall. The lever can be readily sprung into and out of holding engagement with its keeper to hold the detent out of or in operative engagement with the toothed wheel 53. Thus, by appropriate shifting of the levers, either spool may be rotated in whatever direction may be necessary to wind the film thereon from the other spool and reverse rotation of the spools prevented.

In the use of the roll film carrier as represented in Fig. 5, the film strip is unwound from a roll of unexposed film on the spool 23 onto the spool 24, and in its travel from one spool to the other passes out of the housing 21 over two guide rolls 61 and 62 and enters the other housing 22 over two similar guide rolls 61a and 62a, and from the roll 61a in the housing 22 passes between the spool 24 and the guideway for the spool bearing supports to and over a guide and pressure roll 63 from which it travels past two rolls 64 and 65 over the latter of which the film strip is guided to the spool 24 for winding thereon. The rolls 62 and 62a are located lengthwise in the slots 35 and 36 in the plate support 29 in position for holding the portion of the film strip extending between these rolls parallel with and in travelling contact with the front or outer face of the plate support, and the rolls 61 and 61a are located within the respective housings in position for holding the film strip somewhat above and off of the guides for the spool bearing supports. The roll 63 is located in the front portion of the housing 22 and, as presently explained, in addition to guiding the film, it also serves to press the film into driving engagement with driving rollers for a film measuring device or register, while the remaining two rollers 64, 65, as later explained, cooperate with a film cutting device for holding the film while being cut.

The pressure roller 63, as shown in Fig. 10 has the journals at its opposite ends extending through elongated slots 66 in stationary bearing supports 67 in opposite ends of the housing 22 with the journals bearing on spring pressed blocks 68 slidably mounted in the bearing supports 67, whereby the roller is pressed against the back of the film strip and presses the latter into driving engagement with the driving rollers 69 for the film measuring device or register, said rollers 69 being arranged to engage the opposite longitudinal edge portions of the front face of the film. These rollers may have roughened or frictional peripheries such as to ensure positive propulsion of the film pressed thereagainst. The pressure springs 70 for the bearing blocks may be arranged in cavities in the bearing supports 67 between the bearing blocks and adjusting screws 70a, whereby the pressure of the film against the driving rollers 69 may be regulated as required. The driving rollers 69 may be splined or otherwise secured on the shaft 71 to turn therewith and slide axially thereon. Shaft 71 is journalled at its ends in suitable bearings 72 on the outside of the side wall 26 of the housing 22, with the driving rollers projecting through a longitudinally extending opening 73 in the housing wall for engagement with the film. A suitable cover or hood 74, Fig. 5, covers the rollers 69, shaft 71 and the opening 73 to prevent entrance of light through the opening into the spool housing.

The driving rollers 69 being splined or axially movable on the shaft, are adjustable lengthwise of the shaft to different positions necessary for driving engagement with the opposite edge portions of films of different widths. As shown, arms 75 are suitably fixed on and project from the two bearing supports 37, 38 for the spool in the housing 22 and engage in peripheral grooves 76 in the hubs of the drive rollers 69 so that when the bearing supports 37, 38 are adjusted to different distances apart, as required, to accommodate spools of different lengths, the driving rollers 69 will be correspondingly adjusted with the bearing supports toward or from each other, so as to locate them in driving engagement with the opposite edge portions of the film being used in the carrier whatever the width of the film may be.

The shaft 71 is suitably geared, as by a train of gear wheels 77, Fig. 1, at one end of the shaft, with the operating shaft 78 of a measuring or registering device 80. This measuring device may be a counting or registering device of any known or suitable type adapted to indicate in inches and fractions of inches the length or amount of film which passes and turns the driving rollers 69 for the measuring mechanism, so that the operator may determine, by consulting the register 80 the length of amount of film which has been unwound from the roll on the spool 23, for the purpose of enabling him to locate exactly desired or successive portions of the film in the required operative exposure position at the front of the plate support 20. The operating shaft 78 of the measuring device 80, as shown, is provided at its outer end with an operating or finger wheel 81 whereby it is possible for the user of the roll film carrier, by turning the wheel 81, to operate the measuring device 80 and the driving rollers 69 to feed or advance the film without winding it on the spool 24. The measuring device 80 and the drive rollers 69 can be operated by rotation of the operating wheel 81 to feed any particular desired length of film past the drive rollers, and the measuring device or register correspondingly operated to indicate the length of film so fed or advanced by means of the operation of the wheel 81. Such operation of the film and measuring device may be employed, for example, when it is desired to cut off one or more portions of the film which have been exposed without winding the film on the receiving spool 24 to thus enable the severing and development of portions of the film as exposed instead of winding the film on the receiving spool to be developed after the whole film or a desired long part thereof has been exposed and images made thereon.

The roll film carrier is equipped with a cutting mechanism which may be used for cutting off, as may be desired, any portions of the film which have been exposed. This cutting mechanism comprises a knife or blade 85 preferably having a sharp V-shaped longitudinal cutting edge, see Figs. 5, 11 and 12, secured in a holder or block 86 which is slidably mounted on and adapted to be slid lengthwise along a guide bar 87 from edge to edge of the film. The guide bar 87 is located outside of the housing 22 parallel with and opposite the film guide rolls 64 and 65 and is mounted at its ends on posts 88 which are slidable through holes in the adjacent side wall 26 of the housing and are secured at their inner ends to a presser bar 89 located inside the housing between the side wall 26 thereof and the portion of the film that engages the guide rolls 64 and 65. In the normal position of the cutting mechanism, the knife block 86 is positioned at one end of the guide bar 87 with the cutting end of the knife projecting through a slot in the housing wall 26 and a narrow slit in the presser bar 89, laterally beyond one side edge of the film and with the presser bar 89 yieldingly held against the inner face of the housing wall 26 and out of engagement with the film, as by springs 90 surrounding the posts 88 between the outside of the wall 26 and the guide bar. When it is desired to cut the film, the guide bar 87 is pressed inwardly against the action of the springs 90, whereby the presser bar is pressed inwardly against the film and presses and holds the latter firmly against the two guide rolls 64 and 65 at opposite sides of the plane of the knife blade or line of cut. The knife block is then slid lengthwise along the guide bar causing the knife to cut through the film. In this cutting action of the knife, the film is gripped firmly between the presser bar and the two rolls at opposite sides of the line of cut, so that the film will be cut accurately in a straight line, with clean or smooth edges at opposite sides of the cut. The presser bar can be thus pressed inwardly to grip and hold the film by any suitable means, as for instance by finger wheels or nuts 91 having screw threaded engagement with the outer portions of screw posts 92 projecting outwardly from the housing wall 26, with the inner faces of the nut wheels overhanging and engaging the ends of the guide bar. By screwing these nut wheels inwardly, the presser bar will grip and hold the portions of the film at opposite sides of the cut and the presser bar can be left in holding engagement with the severed edges of the film at opposite sides of the cut until it is desired to release the severed portion of the film, and if desired, remove it from the housing 22 for development.

Vacuum or suction means are embodied in the film carrier for holding the portions of the film as they are exposed at the front of the plate support 20 flat and smooth against the face of the support by exhausting the air from between said face and the film. Inasmuch as my film carrier, as explained, is intended for use with roll films of different widths, it is desirable, in order to obtain efficient, economical operation of the vacuum holding means, that it will operate to limit the suction to only an area of the plate support that is covered by the film being used so that when using a narrow film, the air will not be exhausted from portions of the plate support outlying the bounds of the exposed portion by the film. For accomplishing these results, the vacuum holding means, as disclosed herein, is constructed as follows, see particularly Figs. 13–16.

The plate support 20 comprises front and back plates 95 and 96 securely fastened together face to face. In the front plate and covered by the back plate are suction grooves or passages 97, 98, 99 and 100 in the form of rectangles of different dimensions and surrounding one another, the smallest rectangle bounding an area somewhat less than the overlying portion of the narrowest film to be used in the carrier, and the other rectangles each bounding an area that will be covered by the overlying portion of a film of another width that may be used, so that for the film in use, whatever its width, there will be an appropriate suction passage which does not extend beyond the bounds of the portion of the film exposed at the front of the plate support. Small perforations 101 extend from each rectangular groove through the main plate to its front face for exhausting the air from behind the film, and each of the several rectangular grooves is connected by a separate passage 102 which may be formed in a block or plate 103 secured on the back plate 96, with separate controlling valve 104, each of which valves controls communication between a different one of the rectangular grooves and a main suction passage 105, which may be connected by a suction hose or pipe 106 with suction or vacuum-creating means, not shown. By opening the appropriate valve 104 and leaving the others closed, the suction is confined to that one of the rectangular grooves 97—100 with which said open valve is connected by its connecting passage 102. Thus, by the simple operation of the valves, the suction is confined to one only of several different sized groups of suction perforations 101, each of which groups is limited to an area of the plate support 20 which is covered by the particular film being used, depending upon its width, and there is no waste suction through suction perforations that are left uncovered by the film.

Two holding strips 110 are shown for pressing the opposite longitudinal edges of the film, which are apt to curl, against the face of the plate support so that when the suction is applied, it will operate more effectively to draw the film against the plate support. These holding strips 110 are adjustable on the plate support to different distances apart for properly engaging the edges of films of one or another width, for which purpose each holding strip is provided adjacent its opposite ends with split retaining pins 111 adapted to be inserted into and releasably retained in either of several different pairs of holes 112 in the front of the plate support. Four pairs of these holes are shown for each strip to enable adjustment of the strips to four different positions appropriate for use with films of four different widths, but a less or greater number of retaining holes for the strips could be employed, depending upon the number of different width films intended to be used in the roll film carrier.

In Figs. 17 and 18 is illustrated a modification of the vacuum holding means especially adapted for holding separate film sections or pieces of different sizes which it may be desired to hold for exposure on the plate support with their greater dimensions disposed either horizontally or vertically or in other angular disposition. In the vacuum holding means as previously described, the rectangular grooves 97—100 are arranged with their greater dimensions vertically to adapt them to the arrangement disclosed, in which the film is passed in a vertical direction over the plate support 20. But, if it should be desired, for instance, to hold a piece of film of relatively short vertical and long horizontal dimensions on the plate support, the smallest rectangular groove 97 might extend beyond the bounds of the piece of film, and thus interfere with the efficient suction action of the holding means. According to the modification of Figs. 17 and 18, the plate support 20a comprises a stationary rear section 115 and a front section 116 adapted to be turned to and secured in different angular relations to the rear section, about a central connecting bolt or pivot 117. The front section, as in the first construction shown in Figs. 13–16, includes a plate 95a provided with rectangular grooves 97a, 98a, 99a and 100a, arranged similarly to the rectangular grooves in the first construction and communicating with small perforations 101a extending through the front section 116 to its front face. A backing plate 96a secured to the front plate 95a is provided with transverse holes 118, each connecting one of the rectangular grooves 97a—100a with a different one of a plurality of concentric circular grooves 119, one for each rectangular groove, in the rear section 115. Thus, in any angular position to which the front section may be turned, one rectangular groove will communicate with its related circular groove in the rear section 115. Each of the circular grooves communicates by a hole 120 with a connecting passage 121 leading to a suction control valve, as in the case of the connecting passages 102 in the first described construction. Thus, with this modified construction, the front section 116 can be turned to any angular position relative to its back section to locate its rectangular grooves 97a—100a, with their greater dimension either horizontally or vertically, or in other angular relations, and in any of the adjustments, the suction can be confined by appropriate operation of controlling valves to any desired one of the rectangular grooves for confining the suction to the area of the plate supports served by said groove.

I claim:

1. A carrier for sensitized roll films for cameras comprising a supporting base, means on said base for rotatably mounting a film roll spool including bearing suports which are adjustable relatively to each other for mounting spools of different lengths appropriate for films of different widths, means for unwinding film from said spool, a plate on said supporting base past which the film is moved as it is unwound, and against the outer face of which plate successive portions of the film are to be held in position for exposure in a camera for making photographic images on said portions of the film, said plate having formed therein different sized groups of suction apertures in its outer surface for exhausting air from behind said film to hold the film against the face of the plate, each group of suction apertures corresponding in size to a film exposure area depending upon the width of the film used for that area, and a suction passage connectable separably with one or another of said groups of apertures to limit the suction to an area of the plate appropriate to that of the section of film covered thereby.

2. A carrier for sensitized roll films for cameras according to claim 1, in which said groups of suction perforations are of elongated form, and the plate having the same is angularly positionable relatively to said suction passage for placing said groups of perforations with their longer dimensions extending in different directions.

3. A carrier for sensitized roll films for cameras comprising a supporting base, means on said suporting base for rotatably mounting a film roll spool including bearing supports which are adjustable on said base relatively to each other for mounting spools of different lengths appropriate for films of different widths centrally with respect to the carrier, means for unwinding film from said spool, said base having a plate past which the film is moved as it is unwound, and against the outer face of which plate successive portions of the back of the film are to be held in position for exposure in a camera for making photographic images on the front of said portions of the film, said plate having different sized groups of suction apertures in its outer surface for exhausting air from behind the back of said film to hold the film against the face of the plate, said groups of suction apertures being uniformly arranged with respect to the central axis of the carrier, and a suction passage connectable separably with one or another of said groups of apertures corresponding to the width of the film selected for use to limit the suction to an area of the plate covered by the film.

4. A carrier for sensitized roll film of the type having two spools from one of which the film may be wound upon the other, means for detachably mounting said carrier on a camera for exposing successive portions of said film to images received in said camera, said carrier including a supporting base member having a plane face upon which successive portions of said film may engage in passing from one spool to the other, spaced parallel guideways on said base member, a pair of slides in each guideway, supporting journals for the ends of each film spool, a bearing in each slide for rotatably mounting one of said journals, adjusting means on each of said slides engageable with said guideways for independently adjusting and securing said slides at different predetermined distances apart to place said journals in poistion to support spools of different lengths carrying films of different widths, one journal on each pair of slides having means engageable with the associated spool for rotating it, means for rotating said spool-engaging journals for turning a spool to wind film on one spool over said plane face of said base member and upon the other spool, and said supporting base member having parallel, spaced holding strips for engaging side edges of successive portions of said film against said plane face of said base member, said holding strips being adjustable towards and from each other to operably engage the side edges of films of different widths.

5. A carrier for sensitized roll film of the type having two spools from one of which the film may be wound upon the other, means for detachably mounting said carrier on a camera for exposing succesive portions of said film to images received in said camera, said carrier including a supporting base member having a plane face upon which successive portions of said film may engage in passing from one spool to the other, a pair of journals for supporting the ends of each film spool, means on said base member for adjustably suporting said journals for moving towards and from each other and for securing them in adjusted position to support spools of different lengths carrying films of varying widths, means on one journal of each pair engageable with an associated spool for turning said spool, a rotary member extending between and operatively engaging the two journals of each pair for rotating both ends of a spool in unison and along which said journals may be shifted without relative rotation when moved towards and from each other, means for operating either of said rotary members to wind film from one spool over said plane face of said base member upon the other spool, and said base member having associated therewith means operable upon that face of each successive portion of film bearing on said plane face to maintain close contact between said faces during exposure of said film portions to photographic images in said camera.

6. A carrier for sensitized roll film of the type having two spools from one of which the film may be wound upon the other, means for detachably mounting said carrier on a camera for exposing successive portions of said film to images received in said camera, said carrier including a supporting base member, said member mounting a pair of end supports for each film spool on which the spool is removably and rotatably mounted, said supports being adjustable on said base towards and from each other to place them in operative supporting relation to spools of different lengths suitable for films of varying widths, rotating means for each of said spools for turning a spool to wind thereon film from the other spool, said means including a journal rotatable on one of a pair of end supports, means rotatably connecting said journal with the companion support, an operating device for rotating said connecting means and said journal, holding means for each spool operable when turning one of said spools to wind film thereon to prevent reverse rotation of said spool, said holding means being releasable and adjustable to enable reverse rotation of the spools for rewinding the film on the spool from which it was wound, said supporting base having a plane face over and upon which the film moves during passage from one spool to another for supporting flatwise successive portions of film in position for exposure to photographic images in said camera.

7. A carrier for sensitized roll film of the type having two spools from one of which the film may be wound upon the other, means for detachably mounting said carrier on a camera for exposing successive portions of said film to images received in said camera, said carrier including a supporting base member having a plane face upon which successive portions of said film may engage in passing from one spool to the other, said base member having mounted thereon pairs of bearing members for removably mounting said spools, a journal rotatable in one of each pair of the bearing members and operatively engaging a spool, a rotatable member extending between and seated in each pair of bearing members for rotating the associated journal for winding film from one spool to the other, a measuring device on said base member for indicating the lengths of successive increments of film passing over said plane face of said base member by rotation of the spool upon which those increments of film are wound, means for actuating said measuring device by the travel of said film to said winding spool including a rotatable driving element engaged and driven by said film, and resiliently mounted pressure means for yieldingly holding said film in firm driving relation with said driving element.

8. A carrier for sensitized roll film of the type having two spools from one of which the film may be wound upon the other, means for detachably mounting said carrier on a camera for exposing successive portions of said film to images received in said camera, said carrier including a supporting base member having a plane face upon which successive portions of said film may engage in passing from one spool to the other, a pair of bearing members for each film spool adjustably mounted on said base member for movement towards and from each other to support spools of different lengths carrying films of varying widths, means supported by said pairs of bearing members for rotating spools to wind film from one spool to the other; a measuring device on said base member for indicating the lengths of successive increments of film passing over said plane face of said base member by rotation of the spool upon which those increments of film are wound, means for actuating said measuring device by the travel of an increment of film to said winding spool including a shaft rotatably supported in parallel relation to a face of said film and operatively engaging the measuring device, two driving rolls splined on said shaft for movement therealong for engagement with a film by which they may be driven, and means on each bearing member to shift a driving roll therewith, whereby the two rolls engage the side edges of the film on the spools to the length of which the bearing members have been adjusted.

9. A carrier for sensitized roll film of the type in which the film is wound on a spool, said carrier including a supporting base member having a plane face over which the film moves as it is unwound and which supports portions of said film flatwise during exposure in a camera, means on said base member for rotatably mounting the spool on which the roll of film is wound, including bearing supports which are adjustable relatively to each other for mounting spools of different lengths appropriate for films of different widths, a measuring device for indicating the length of portions of film unwound from its spool, means for simultaneously actuating said measuring device and unwinding said film, said means including rotatable driving elements operatively engageable with unwound portions of said film, said elements being adjustable by and with said spool bearing supports to place said elements in driving engagement with opposite edge portions of films of different widths, and said driving elements being mounted on a rotatable member having a driving connection with said measuring device, whereby the latter is operated when said film is driven.

10. A carrier for sensitized roll film of the type having two spools from one of which the film may be wound upon the other, means for detachably mounting said carrier on a camera for exposing successive portions of said film to images received in said camera, said carrier including a supporting base member having a plane face upon which successive portions of said film may engage in passing from one spool to the other, said base member having mounted thereon pairs of bearing members for removably mounting said spools, a journal rotatable in one of each pair of said bearing members and operatively engaging a spool, a rotatable member extending between and seated in each pair of bearing members for rotating the associated journal for winding film from one spool to the other, a measuring device on said base member for indicating the lengths of successive increments of film passing over said plane face of said base member by rotation of the spool upon which those increments of film are wound, means for actuating said measuring device by the travel of said film to said winding spool including two spaced driving elements, a rotatable shaft upon which they are mounted for rotation thereon in unison and upon which they are positioned to engage the side edge portions only of the successive increments of said film at one face thereof, and a resiliently mounted pressure roll engageable with the other face of said film and extending from one edge thereof to the other opposite the driving elements to press the film firmly thereagainst at said edge portions, and said pressure roll supporting the intervening film against sagging or disengagement of said film from said driving elements.

WILLIAM C. HUEBNER.

REFERENCES CITED

The following references are of record in the file of this patent:

UNITED STATES PATENTS

| Number | Name | Date |
|---|---|---|
| 689,751 | Robertson | Dec. 24, 1901 |
| 700,120 | Houston | May 13, 1902 |
| 706,216 | Browning | Aug. 5, 1902 |
| 706,245 | Louden | Aug. 5, 1902 |
| 1,068,895 | Harper | July 29, 1913 |
| 1,618,387 | Prindle | Feb. 22, 1927 |
| 1,651,441 | Caps | Dec. 2, 1927 |
| 1,945,481 | Dilkes | Jan. 30, 1934 |
| 1,998,324 | Lloyd | Apr. 16, 1935 |
| 2,282,427 | Powers | May 12, 1942 |

FOREIGN PATENTS

| Number | Country | Date |
|---|---|---|
| 23,228 | Great Britian | Dec. 30, 1899 |
| 1,902 | Great Britain | of 1904 |
| 441,830 | Great Britain | Apr. 20, 1934 |